April 22, 1969     O. A. O'NEIL     3,439,818

GRAPPLE FOR TRACTOR TYPE VEHICLES

Filed Feb. 13, 1967

INVENTOR
ORVAL A. O'NEIL

BY *Irons, Birch, Swindler & McKie*
ATTORNEYS

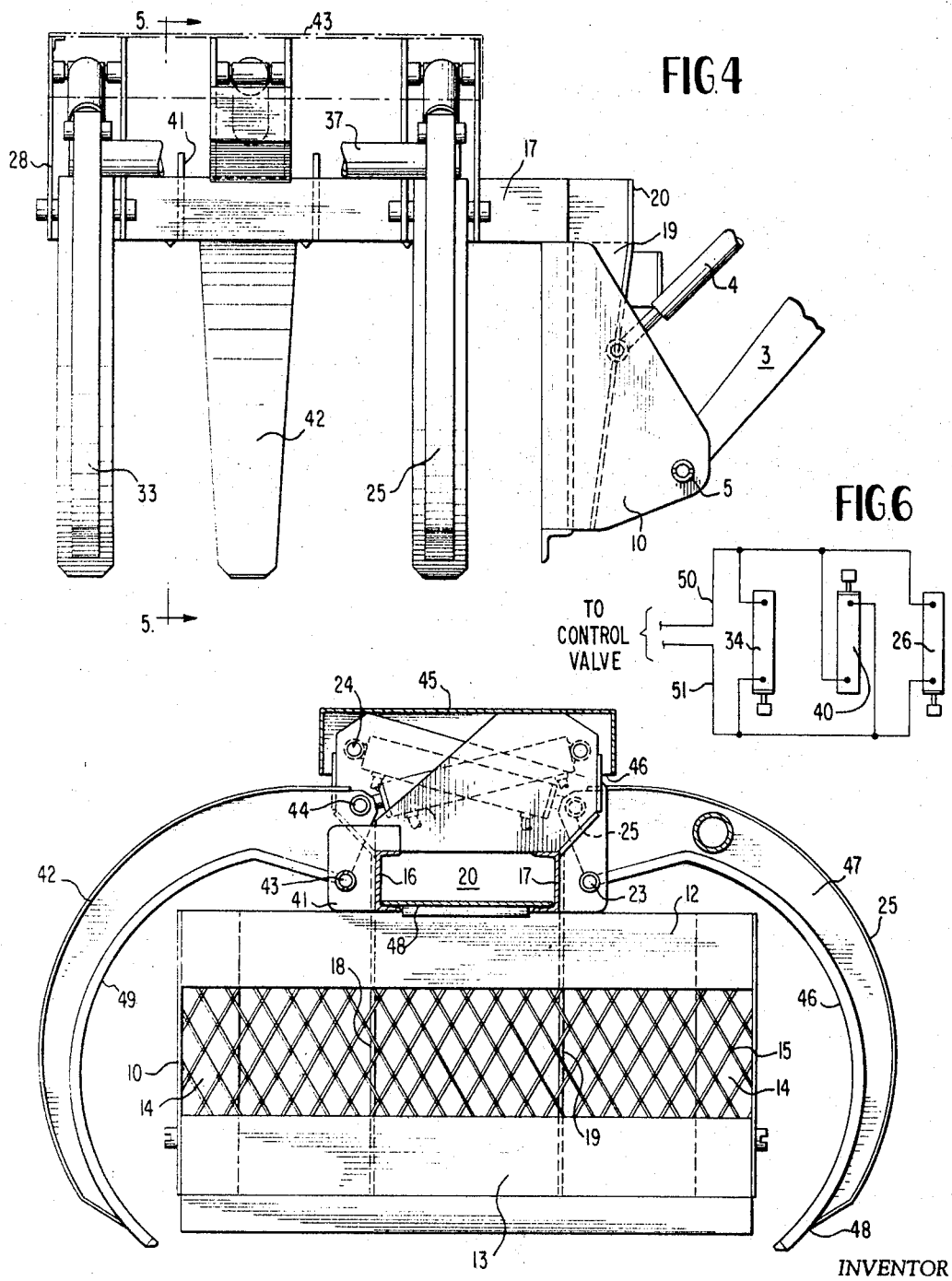

United States Patent Office 3,439,818
Patented Apr. 22, 1969

3,439,818
GRAPPLE FOR TRACTOR TYPE VEHICLES
Orval A. O'Neil, Cogswell, N. Dak., assignor to Melroe Manufacturing Company, Gwinner, N. Dak., a corporation of North Dakota
Filed Feb. 13, 1967, Ser. No. 615,640
Int. Cl. B66c *3/16, 1/44;* B25b *7/00*
U.S. Cl. 214—147                                    6 Claims

ABSTRACT OF THE DISCLOSURE

Grapple equipment on a tractor type vehicle is provided preferably in the form of an attachment that is interchangeable with the conventional bucket or scoop of front-end loader tractor. The equipment is particularly suited for picking up and transporting logs. The vehicle approaches the logs from their ends and hydraulically actuated grappling teeth engage opposite sides of the logs in picking them up. The teeth engaging opposite sides of the logs swing inwardly in spaced parallel planes and are actuatable so as to accommodate and adjust to different positions of the logs relative to the equipment as it approaches to pick them up. The load is maintained level as it is being raised by pivoting the grapple attachment relative to the lifting arms of the front-end loader tractor through utilization of the conventional hydraulic cylinder actuators that are employed with the bucket or scoop of the front-end loader tractor.

---

This invention relates to grapple equipment for tractor type vehicles and more particularly to a grapple attachment for a front end loader tractor especially suited for picking up and transporting logs.

Log grappling devices are well known in the lumber and logging industry. They are used for removing logs from the forest area where they have been cut, moving them from one place to another, stacking, and loading and unloading them from trucks and railroad cars. These devices as heretofore known are expensive and costly to maintain. Consequently, it is uneconomical for operators who cannot make full time use of a logging vehicle to own such a specialized device. Thus, in many cases manual labor is used in these logging operations, a procedure which is slow and a type of work for which it is sometimes difficult to locate willing help. If an operator could combine log handling and other functions such as digging, for example, into one machine the cost of owning such equipment is not only economically feasible but also speed in the log handling can be achieved over the use of manual labor.

It is, therefore, an object of this invention to provide a grapple attachment that is interchangeable with the usual bucket or scoop of a front end loader tractor.

The grappling teeth on most log handling vehicles now in use are arranged so that the logs must be approached from the side. After the teeth are centered on the log pile by maneuvering the truck or vehicle the teeth are closed over the logs. Often the teeth cannot uniformly grip the logs due to uneven stacking or other factors so that one set of teeth engage some logs and another set of grapples engage a different set of logs delaying the loading operation.

It is, therefore, another object of this invention to provide grapple equipment wherein the teeth incident their being actuated position themselves around the load without regard to whether the vehicle and grapple attachment is centered relative to the load itself and without regard to the shape of the load.

A further object of this invention is to provide a grapple attachment which effectively picks up logs or other elongated articles by approaching them from their ends rather than approaching them from the side.

A still further object of this invention is to provide a grapple attachment which is capable of holding the load and discharging it in a horizontal position at any height within the lifting range of the front-end loader tractor lifting arms.

Also it is an object to provide grapple equipment wherein a pair of spaced grappling teeth swing inwardly to engage one side of the load to be picked up and grappling tooth swings inwardly to engage the opposite side of the load, this latter tooth moving in a plane intermediate the respective planes in which the pair of spaced teeth swing.

Further objects and advantages of the invention will best be understood by reference to the following detailed description in conjunction with the accompanying drawings which illustrate a presently preferred embodiment of the invention, and wherein:

FIGURE 4 is a side elevational view of the structure shown in FIGURE 3.

FIGURE 5 is a sectional view taken on line 5—5 of FIGURE 4 showing the teeth in their open position.

FIGURE 6 is a schematic drawing of the hydraulic system for the hydraulic cylinders of the grapple attachment.

The grapple attachment is generally indicated at 1 being shown connected to the forward outer ends 3 of the lifting arms 7 of a front end loader tractor 2. The tractor vehicle may have the construction disclosed in Melroe et al. Patent 3,231,117 issued Jan. 25, 1966. As illustrated in this patent a material handling bucket or scoop is pivotally connected to the forward outer ends of the lifting arms to provide a front end loader tractor. A pair of hydraulic cylinder actuators are connected between the bucket and respective lifting arms to enable control of the position of the bucket relative to the lifting arms as those arms are elevated. Also a pair of hydraulic cylinder actuators are connected between the respective lifting arms and the vehicle body to carry out the function of elevating the lifting arms and bucket thereon. In accordance with the instant invention the bucket or scoop is removed and the grapple attachment pivotally connected to the lifting arm ends in its place. The bucket position control hydraulic cylinder actuators are retained and in turn are employed to control the position of the grapple attachment, ideally to maintain the log load at an attitude or angle relative to the vehicle for most effective handling of the particular shape and weight of the load.

Figure 1:
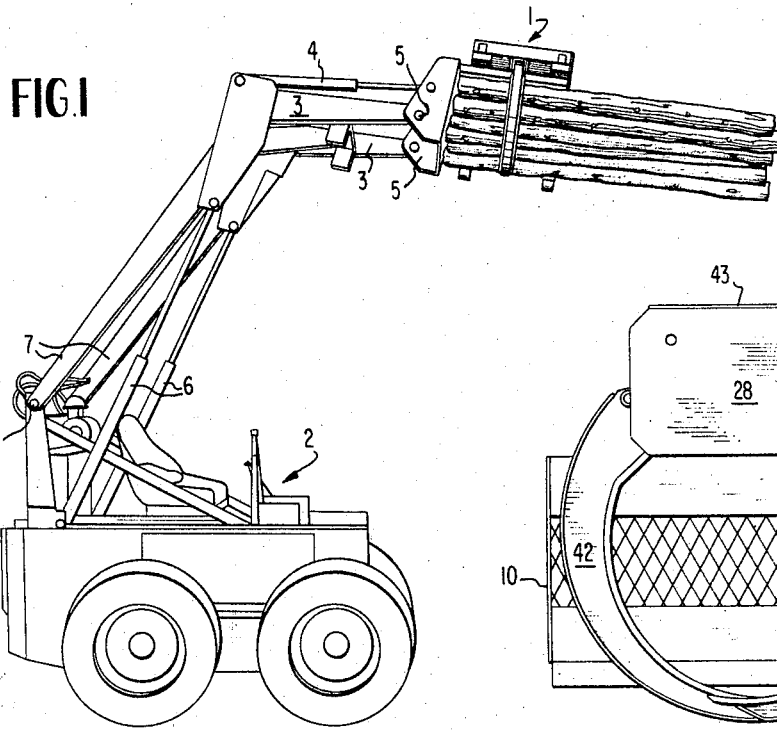
FIGURE 1 shows the grapple attachment as it is associated with the boom arms of at front end loader tractor.

Referring again to the drawings herein, the grapple attachment 1 is pivotally connected on pivot pins 5 to the forward outer ends 3 of the vehicle lifting arms 7. The outer ends 3 are in fixed angular relation to the remainder of the lifting arms as seen in FIGURE 1. Hydraulic cylinder actuators 4 connected between the respective lifting arms and the grapple attachment 1 are effective to control the position of the grapple attachment relative to the lifting arms. The lifting arms are pivotally connected at 9 to the upper ends of stanchions secured to the body of the tractor vehicle 2. Hydraulic cylinder actuators 6 connected between the vehicle body and the respective lifting arms 7 are provided to raise and lower the lifting arms incident picking up and unloading a load from the grapple attachment 1.

Each of the hydraulic cylinder actuators 4 and arm outer ends 3 is pivotally connected to spaced mounting plates 10 and 11 which form a part of the supporting frame of grapple attachment 1. The plates are generally triangularly shaped and the pivotal connections are located so that extension or retraction of the actuators 4 will pivot the grapple attachment to the desired position relative to lifting arms 7.

Figure 2:
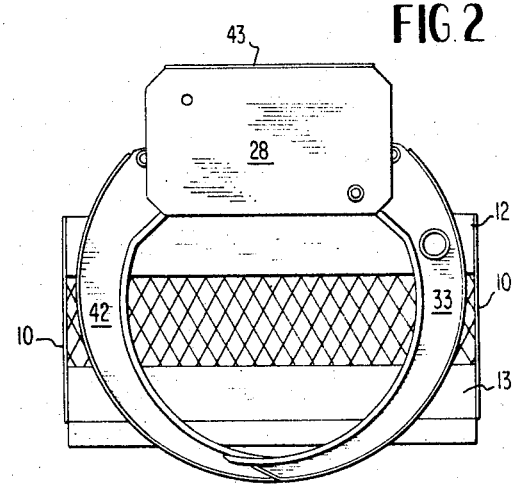
FIGURE 2 is a front end view of the attachment showing the teeth of the grapple in a partially closed position.
Figure 3:
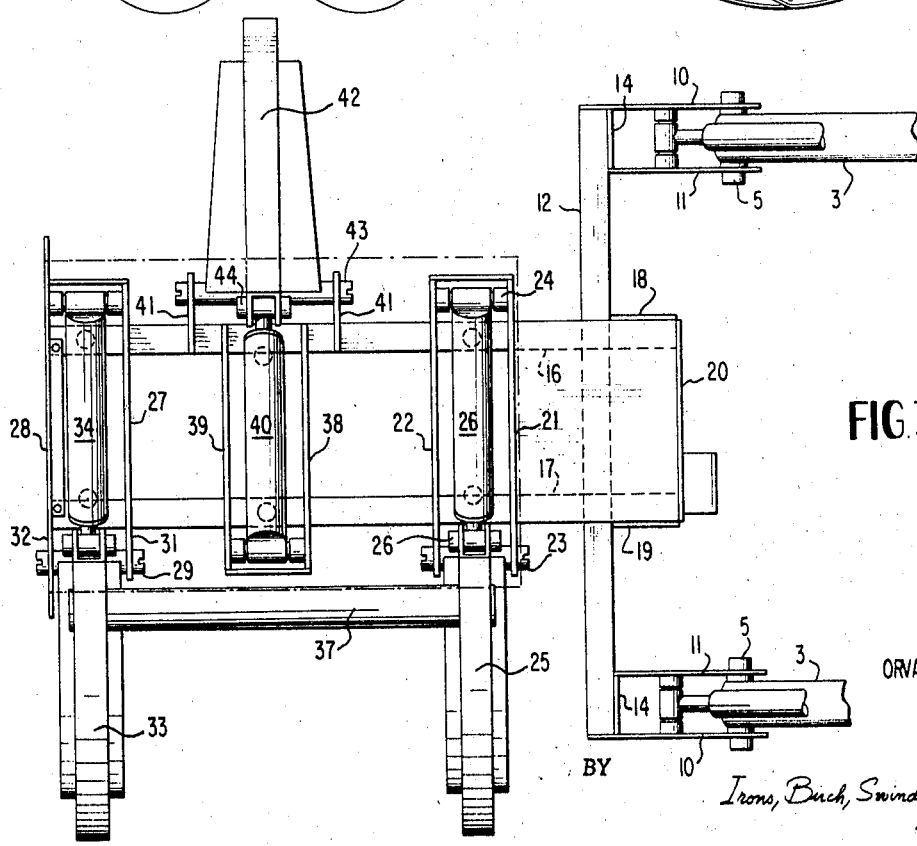
FIGURE 3 is a top plan view of the grapple attachment showing the relationship between the grapple teeth, hydraulic cylinders, and supporting frame of the grapple attachment in relation to the forward ends of the boom arms of the front end loader tractor.

Outside mounting plates 10 are connected across the ends of rearwardly facing upper and lower channels 12 and 13 as shown in FIGURES 2 and 3. Spacer plates 14 extend between plates 10 and 11 at each side of the supporting frame with their flat surfaces connected across channels 12 and 13. Inside mounting plates 11 are joined to both spacer plates 14 and channels 12 and 13 providing a rigid connective structure between the grapple attachment and the lifting arms of the vehicle. A screen web 15 bridges between channels 12 and 13 to form with such channels a backstop.

As illustrated in FIGURES 4 and 5 the grapple attachment supporting frame further comprises an L-shaped assembly including two inwardly facing horizontal channels 16 and 17 forming an elongated support extending forwardly of the backstop. These channels are rigidly connected to channel 12 and to two vertical downwardly tapering plates 18 and 19. A rear plate 20 is connected across the rear edges of plates 18 and 19 and the rear ends of channels 16 and 17. This arrangement provides rigid support for the horizontal channel 16 and 17 of the grapple attachment permitting its use in the handling of heavy loads without concern for distortion in twisting or bending the supporting frame.

Mounting on channels 16 and 17 near their juncture with channel 12 and also at their free ends are the supporting structures for the hydraulic cylinder actuators and teeth for one side of the grapple. These structures comprise generally triangular plates whose length is greater than the space between channels 16 and 17 so that they extend over the channel sides. The plates are arranged so that the cylinders 26, 34 and 40 are supported in side by side spaced parallel relation. The rearmost supporting structure includes cylinder mounting plates 21 and 22 with portions extending down along channel 17. The depending portions of the cylinder mounting plates 21 and 22 are provided with openings to receive a pin 23 which pivotally mounts a grappling tooth 25. In addition, the cylinder 26 of a hydraulic cylinder actuator is pivotally connected by pin 24 between plates 21 and 22 at the opposite end of the plates from the tooth support pin 23. The hydraulic cylinder actuator is aligned with tooth 25 so that they both lie in the same plane. The piston rod of the hydraulic cylinder actuator is pivotally connected to tooth 25 by a pin 26 disposed a short distance from pin 23 so that the actuator will be effective in swinging tooth 25 about pivot pin 23 is picking up and releasing a load.

The front supporting structure includes cylinder mounting plates 27 and 28. Plate 27 is substantially the same size and shape as plates 21 and 22. Plate 28 is generally rectangular and extends from the lowermost portion of channels 16 and 17 to the same height as plates 21, 22 and 27. It also extends laterally to provide a protective shield across the end of the supporting frame. This plate 28 is also useful and effective as a "bump" plate to push against the end of a pile of logs to even-up the ends of the logs in the pile. Cylinder mounting plate 27 includes a depending portion 31 that is provided with an opening to receive a pivot pin 29 which pivotally joins tooth 33 to plates 27 and 28. A portion 32 of plate 28 also is provided with an opening corresponding with the opening in depending portion 31 to receive the opposite end of pin 29.

The cylinder 34 of a hydraulic cylinder actuator is pivotally mounted between plates 27 and 28 in a manner similar to the mounting heretofore described for hydraulic cylinder 26. The hydraulic cylinder actuator is aligned with tooth 33 so that they both lie in the same plane. The piston rod of this actuator is pivotally connected to tooth 33 similar to that heretofore described with reference to pivot pin 26 and tooth 25. Thus, tooth 33 will be actuated by this hydraulic cylinder actuator similar to the actuation of tooth 25.

A tubular torsion bar 37 is fixedly secured to extend horizontally between teeth 25 and 33 to join the teeth so that both teeth will normally be constrained to identical movement about their pivot pins by the two described hydraulic cylinder actuators. However, this torsion bar will allow limited relative pivoting movement between teeth 25 and 33 to allow the teeth to firmly clamp against the side of an irregularly shaped load.

Connected across channels 16 and 17 intermediate the supporting structures for cylinders 26 and 34 are cylinder mounting plates 38 and 39 which provide a housing for the cylinder 40 of a third hydraulic actuator. One end of cylinder 40 is pivotally connected to the portion of plates 38 and 39 overlying channel 17.

To the front and rear of plates 38 and 39 are two spaced mounting plates 41 fixed to channel 16. A grappling tooth 42 is pivotally mounted by pivot pin 43 on plates 41. The hydraulic cylinder actuator is aligned with tooth 42 so that they both lie in the same plane. The piston rod extending from cylinder 40 is pivotally connected to tooth 42 by a pin 44 located a short distance from its pivot pin 43. Thus, extension and retraction of the actuator will be effective to swing tooth 42 about pivot pin 43 in picking up and releasing a load.

Removably secured over the cylinder mounting plates is a shield 45 with depending side and rear portions. The shield protects the operating mechanism of the teeth from damage from falling logs, rocks or other debris as well as from exposure to the weather. The elongated support of the supporting frame basically formed by channels 16 and 17 is closed at its bottom between these channels by a filler plate 48 reinforced on its underside by support angles.

The grapple teeth can best be described by reference to FIGURES 3, 4 and 5. Teeth 25 and 33 are of the same configuration so a description of one, such as 25, will suffice as a description for both. The tooth 25 is generally arcuate in shape. It has a flat inwardly facing surface 46 to engage the load and a reinforcing rib portion 47 at right angles to it. The reinforcing portion 47 is relatively thick at its connection to the piston rod for the hydraulic cylinder actuator to withstand the high stresses occurring there. The reinforcing portion it tapered to merge with the inwardly facing portion 46 at the point 48 of the tooth. When the actuator is extended from the position shown in FIGURE 5, tooth 25 swings about its pivot pin 23 into the partially closed position illustrated in FIGURE 2. Because teeth 25 and 33 are connected by bar 37 their swinging movements will be the same, under the combined control and forces of the two actuators for the teeth.

Tooth 42 is generally of the same configuration as teeth 25 and 33. However, its flat inwardly facing surface 49 is substantially wider than the corresponding surfaces on teeth 25 and 33. This flat surface gradually tapers from its widest portion at the pivot pin for the tooth to about the same width as the surface 46 on tooth 25 has at its free end. Upon extension of the actuator connected to tooth 42, the tooth will move about its pivot from its open position to the partially closed position shown in FIGURE 2.

It is to be noted that the respective teeth 25, 33 and 42 are pivotally mounted on the supporting frame of the grapple attachment such that the teeth swing in parallel planes with the plane of movement of tooth 42 being disposed intermediate the planes of movement of the two teeth 25 and 33, these latter teeth moving conjointly under control of torsion bar 37. This mounting relationship of the teeth permits them to swing together with tooth 42 passing between teeth 25 and 33. FIGURE 2 shows the teeth in a partially closed condition. Under control of the hydraulic cylinder actuators, the teeth may move closer together than the position shown in FIGURE 2 with the teeth almost completely overlapping each other. By reason of this capability, a single relatively small diameter log or group of logs may be picked up and clamped by the teeth pressing the small diameter load up against the underside of the elongated support part of the supporting frame.

It also is to be pointed out that although a single tooth 42 has been illustrated and described herein, it is contemplated that more than one tooth may be provided in place of the single tooth 42. However, it is considered important that the teeth on the opposite sides of the supporting frame be pivotally mounted such that they may swing in between one another to nestingly interengage in picking up and gripping the load for transportation.

As illustrated in FIGURE 6, the cylinders 26, 34 and 40 of the three grapple operating hydraulic actuators are connected to two main fluid lines 50 and 51. Flow of hydraulic fluid through these lines is controlled from the cab of the tractor vehicle by means of suitable manually operable valve means (not shown). The lines 50 and 51 are common to all three actuator cylinders. As a result, all the actuators are extended or contracted simultaneously depending upon manipulation of the valve means in the vehicle cab. Thus, each actuator is permitted to extend until the tooth it actuates comes into engagement with the load which will stop the tooth until the tooth or teeth on the opposite side come into contact with the load.

This is advantageous because if the load is not centered between the teeth or if the load is of irregular shape the teeth 25 and 33, for example, on one side of the grapple may engage it before the tooth 42 on the other side. In the event this occurs, the teeth on the side in contact with the load will stop and the fluid will be diverted to the actuator for the tooth on the other side, and this tooth on the other side will continue to close until it also is in engagement with the load. When all the teeth on both sides engage the load, additional hydraulic pressure will tend to compact and firmly grip the load so it can be readily raised and transported.

Operation of the grapple to move logs is obtained by driving the vehicle up to the end of the log pile then exhausting fluid from the actuator cylinders to open the teeth to the position shown in FIGURE 5 whereby the logs can be straddled. By introducing hydraulic fluid to the cylinders, the grapple teeth are closed tightly around the logs with the log ends held against the backstop formed by channels 12 and 13, and web 15. The hydraulic cylinder actuators 6 on the vehicle can then be operated to raise the logs and the log grapple attachment into an overhead position such as shown in FIGURE 1. During this lifting movement flow of fluid to or from actuators 4 can be regulated to rock the grapple supporting frame relative to lifting arm ends 3 so as to control the log load at the desired attitude relative to the vehicle.

Control of the attitude or inclination of the load relative to the tractor vehicle is a distinct advantage. In lifting a heavy or particularly long load, it is desirable to tip the load upwardly toward a vertical position. This action will bring the center of gravity of the load closer to the tractor vehicle, thereby stabilizing the load handling and avoiding the possibility of the tractor vehicle tipping forward under the weight or length of the load. This, in effect, increases the load carrying ability of the tractor vehicle equipped with the grapple apparatus of this invention. Also where the tractor vehicle transports the load over uneven or hilly terrain, the ability to control the attitude of the load relative to the movement of the vehicle over this terrain is advantageous in stable handling of the load.

When it is desired to release the logs either on the ground or at some higher level such as into truck body or on top of a log pile, the logs are placed in position by manipulation of actuators 6 and 4 on the tractor vehicle to respectively adjust the elevation of the logs and their angle. When the logs are properly positioned, fluid is exhausted from the cylinders of the grapple teeth actuators, thereby opening the teeth to release the logs.

While the present invention has been shown with reference to an attachment for grappling of logs, it should be understood that it is not limited to use with this specific type load. The broad concept of the invention may be used in any material handling system or apparatus wherein it is desirous to quickly and easily adapt the vehicle to carry a load which may have an irregular shape. Also it is within the scope of this invention to provide a vehicle permanently embodying the grapple features of this invention. While the present invention has been shown in one specific embodiment, it will be obvious to those skilled in the art that it is not so limited but is susceptible of various changes and modifications without departing from the spirit and the scope of the invention.

I claim:

1. A grapple attachment to be attached to the lifting arms of a tractor vehicle comprising:
   a supporting frame having means for mounting the attachment to extend forwardly of the vehicle and be carried by the vehicle lifting arms, said frame including at its rearmost portion a depending back stop and providing an elongated support extending forwardly of said back stop;
   a pair of spaced grappling teeth pivotally connected to extend downwardly from one side of said support and a separate grappling tooth pivotally connected to extend downwardly from the opposite side of said support, said separate grappling tooth being disposed to pivot in a plane intermediate the respective planes in which said pair of spaced grappling teeth pivot;
   hydraulic cylinder actuators connected between said supporting frame and said grappling teeth to cause pivoting movement of said teeth about their pivot points;
   first and second spaced pairs of mounting plates mounted on said elongated support, said plates pivotally supporting the hydraulic cylinder actuators for said pair of grappling teeth, and
   a third pair of mounting plates are mounted on said elongated support with said third pair being intermediate said first and second spaced pairs, said third pair pivotally supporting the hydraulic cylinder actuator for said separate grappling tooth.

2. A grapple attachment to be attached to the lifting arms of a tractor vehicle comprising:
   a supporting frame having means for mounting the attachment to extend forwardly of the vehicle and be carried by the vehicle lifting arms, said frame including at its rearmost portion a depending back stop and providing an elongated support extending forwardly of said back stop;
   a pair of spaced grappling teeth pivotally connected to extend downwardly from one side of said support and a separate grappling tooth pivotally connected to extend downwardly from the opposite side of said support, said separate grappling tooth being disposed to pivot in a plane intermediate the respective planes in which said pair of spaced grappling teeth pivot;
   a plurality of hydraulic cylinder actuators each pivotally connected to one of said grappling teeth and each connected between said supporting frame and said grappling teeth to cause pivoting movement of said teeth about their pivot points;
   said hydraulic cylinder actuators each having an inlet conduit and an outlet conduit, said inlet conduits being connected to a common main inlet conduit and said outlet conduits being connected to a common main outlet conduit, whereby fluid supplied from said main inlet conduit to all actuator cylinders moves the respective teeth toward engagement with the load with the tooth first engaging the load being thereby halted in its movement and supplied fluid thereafter continuing to move the nonload engaging teeth until all teeth engage the load.

3. A grapple attachment to be attached to the lifting arms of a tractor vehicle comprising:

a supporting frame having means for mounting the attachment to extend forwardly of the vehicle and be carried by the vehicle lifting arms, said frame including at its rearmost portion a depending back stop and providing an elongated support defining a housing structure extending forwardly from the upper portion of said back stop;

a plurality of grappling teeth pivotally connected to said supporting frame adjacent the underside of said housing structure with at least one grappling tooth disposed to extend downwardly from each side of said elongated support;

separate hydraulic cylinder actuating means connected between the supporting frame and a grappling tooth on each side of said elongated support, each said cylinder actuating means extending across said elongated support generally within said housing structure to a grappling tooth on the opposite side of said elongated support, said cylinder actuating means being disposed in substantially side by side spaced parallel relation on said elongated support and a common fluid supply conduit means for the actuating means on both sides of said support whereby upon introduction of fluid to said common supply conduit means said grappling teeth on opposite sides of said support pivot toward each other with the grappling tooth on one side of said support being free to stop upon engaging one side of the load to be picked up while the grappling tooth on the opposite side of said support continues to move until it engages the opposite side of the load.

4. Grapple equipment for picking up and transporting a load comprising:

a tractor type vehicle having lifting arms including a first portion thereof pivotally connected to said vehicle to swing about a horizontal axis, a second portion of said lifting arms connected in fixed angular relation to said first portion, actuating means connected to said lifting arms to swing said lifting arms about said horizontal axis, a supporting frame pivotally connected adjacent the outer ends of said second portion of said lifting arms, actuating means for pivoting said supporting frame about its pivotal connection with said second portion of said lifting arms, said supporting frame including at its rearmost portion a depending back stop, and providing an elongated support defining a housing structure extending forwardly from the upper portion of said back stop;

a plurality of grappling teeth pivotally connected to said supporting frame adjacent the underside of said housing structure in opposed relation on opposite sides of said elongated support to pivot about axes generally parallel to said support; and actuating means connected between said supporting frame and said grappling teeth extending across said elongated support to cause pivoting movement of said teeth about their pivot axes.

5. Grapple equipment as described in claim 4 wherein said plurality of grappling teeth are comprised of a pair of spaced grappling teeth pivotally connected to extend downwardly from one side of said elongated support and a separate grappling tooth pivotally connected to extend downwardly from the opposite side of said support, said separate grapple tooth being disposed to pivot in a plane intermediate the respective planes in which said spaced grappling teeth pivot.

6. Grapple equipment as described in claim 4 wherein said actuating means comprises separate hydraulic cylinder actuators connected between the supporting frame and a grappling tooth on each side of said elongated support;

said hydraulic cylinder actuators lying in substantially side by side spaced parallel relation on said elongated support; and a common fluid supply conduit means for the actuators on both sides of said support whereby upon introduction of fluid to said common supply conduit means said grappling teeth on opposite sides of said support pivot toward each other with the grappling tooth on one side of said support being free to stop upon engaging one side of the load to be picked up while the grappling tooth on the opposite side of said support continues to move until it engages the opposite side of the load.

References Cited

UNITED STATES PATENTS 2,611,498   9/1952   Broersma.
2,862,756   12/1958  Larson _____ 294—106 X
2,903,294   9/1959   Shook _____ 294—88

GERALD M. FORLENZA, *Primary Examiner.*

GEORGE F. ABRAHAM, *Assistant Examiner.*

U.S. Cl. X.R.

294—87, 106